G. C. Taft,
Twine Cutter.
Nº 99,494.   Patented Feb. 1. 1870.
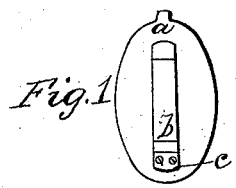
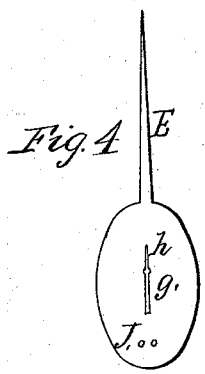
Witnesses;
Geo. E. Taft Jr.
H. Hill
Inventor;
Geo. C. Taft

United States Patent Office.

GEORGE C. TAFT, OF WORCESTER, MASSACHUSETTS.

Letters Patent No. 99,494, dated February 1, 1870; antedated January 21, 1870.

IMPROVEMENT IN TWINE-CUTTER

The Schedule referred to in these Letters Patent and making part of the same.

To all whom it may concern:

Be it known that I, GEORGE C. TAFT, of the city and county of Worcester, and State of Massachusetts, have invented a new and useful Improvement in Twine-Cutter; and I do hereby declare that the following is a full, clear, and exact description of the same, which will enable those skilled in the art to make and use the same, reference being had to the accompanying drawings, forming a part of this specification, in which—

Figure 1 represents a face or front view of my improved twine-cutter.

Figure 2 represents a vertical side view.

Figure 3 represents a vertical central view, in which is shown the form of knife $d$.

Figure 4 represents a plan view.

This invention relates to an improved twine-cutter, which has many advantages over the stationary twine-cutter which is in common use.

My improved twine-cutter is so arranged that it can be attached to the vest, or any convenient place on a person's clothing, when wanted for use, as shown in fig. 1.

$a$ represents a plan view of the shield, fig. 1.

$b$ represents the spring-bar, to which the cutting-knife is secured.

$c$ represents the two screws which confine the spring-bar $b$ to shield $a$, as shown in fig. 1.

$d$ represents the cutting-knife, which is attached to spring-bar $b$, which cutting-knife, in form, is a right angle, forming two distinct cutting-edges.

The lower part of the cutting-knife $d$ passes through shield $a$, for the purpose of forming two distinct cutting-edges upon the cutting-knife, as shown in fig. 3 and letter $d$.

The object in so forming the cutting-knife, is to prevent the possibility of the twine passing the first and second cuts without being cut entirely off.

$e$ represents the breech-pin, for the purpose of confining the cutter-shield to the vest, or any convenient place on the person when wanted for use.

$f$ represents a hook, which secures pin $e$ in the proper fastenings while the cutter is in use.

$g$ represents the form of shield, in fig. 4, though I do not confine myself to any given form of shield.

$h$ represents the slot cut through the centre of the shield, as shown in fig. 4, for the purpose of allowing the lower part of the cutting-knife $d$ to pass through the shield, as shown in figs. 2 and 3.

$I$ represents the two screw-holes, which receive the two screws, for the purpose of holding spring-bar $b$, as shown in fig. 1, letter $c$.

Having thus described my invention,

What I claim as new, and desire to secure by Letters Patent, is—

The twine-cutter herein described, having spring-bar $b$, and knife $d$, arranged upon the shield $a$, and adapted for attachment to the operator's garment by the pin $e$ and hook $f$, or their equivalents, substantially as specified.

GEO. C. TAFT.

Witnesses:
GEO. C. TAFT, Jr.,
CHARLES B. CHAPMAN.